US008330134B2

(12) United States Patent
Yee

(10) Patent No.: US 8,330,134 B2
(45) Date of Patent: Dec. 11, 2012

(54) OPTICAL FAULT MONITORING

(75) Inventor: Dawson Yee, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 12/559,160

(22) Filed: Sep. 14, 2009

(65) Prior Publication Data

US 2011/0062309 A1 Mar. 17, 2011

(51) Int. Cl.
*G01V 8/00* (2006.01)

(52) U.S. Cl. ............. 250/559.39; 250/201.1; 250/559.4; 250/559.41; 250/559.42; 250/559.46; 356/243.8; 359/15

(58) Field of Classification Search ............... 250/201.1, 250/559.39, 559.4, 559.41–559.43, 559.45, 250/559.46; 356/243.8; 359/15; 235/454, 235/462.06, 462.31
See application file for complete search history.

(56) References Cited

U.S. PATENT DOCUMENTS

| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |

(Continued)

FOREIGN PATENT DOCUMENTS

CN 101254344 B 6/2010

(Continued)

OTHER PUBLICATIONS

Taga, et al. , "Power Penalty Due to Optical Back Reflection in Semiconductor Optical Amplifier Repeater Systems", Retrieved at <<http://ieeexplore.ieee.org/stamp/stamp.jsp?arnumber=00053262>>, IEEE Photonomics Technology Letters , vol. 2, No. 4, Apr. 1990, pp. 279-281.

(Continued)

*Primary Examiner* — Georgia Y Epps
*Assistant Examiner* — Kevin Wyatt
(74) *Attorney, Agent, or Firm* — Alleman Hall McCoy Russell & Tuttle LLP

(57) ABSTRACT

Various embodiments related to monitoring for optical faults in an optical system are disclosed. For example, one disclosed embodiment provides, in an optical system comprising a light source, a light outlet, and an optical element disposed between the light source and the light outlet, a method of monitoring for optical system faults. The method includes detecting, via a light sensor directed toward an interface surface of the optical element closest to the light source, an intensity of light traveling from the interface surface of the optical element to the light sensor, and comparing an intensity of light detected to one or more threshold intensity values. The method further includes identifying an optical system fault condition based on comparing the intensity of light detected to one or more threshold values, and modifying operation of the optical system.

17 Claims, 3 Drawing Sheets

U.S. PATENT DOCUMENTS

| | | |
|---|---|---|
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,291,028 A * | 3/1994 | Droge et al. .................. 250/568 |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,509,967 B1 | 1/2003 | Pingel et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,149,383 B2 | 12/2006 | Chen |
| 7,162,114 B2 | 1/2007 | Donval et al. |
| 7,170,492 B2 | 1/2007 | Bell |
| 7,184,048 B2 | 2/2007 | Hunter |
| 7,184,585 B2 | 2/2007 | Hamza et al. |
| 7,185,987 B2 | 3/2007 | Tamura |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |

| | | | |
|---|---|---|---|
| 7,898,522 B2 | 3/2011 | Hildreth et al. | |
| 8,028,918 B2* | 10/2011 | Zhang et al. | 235/462.31 |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2003/0103211 A1* | 6/2003 | Lange et al. | 356/479 |
| 2005/0199725 A1* | 9/2005 | Craen et al. | 235/462.22 |
| 2005/0200840 A1* | 9/2005 | Terui | 356/237.2 |
| 2007/0215822 A1* | 9/2007 | Wuestefeld | 250/559.4 |
| 2007/0295814 A1* | 12/2007 | Tanaka et al. | 235/454 |
| 2008/0026838 A1 | 1/2008 | Dunstan et al. | |
| 2009/0084851 A1* | 4/2009 | Vinogradov et al. | 235/462.21 |

FOREIGN PATENT DOCUMENTS

| | | |
|---|---|---|
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2008109932 A1 | 9/2008 |

OTHER PUBLICATIONS

"Beam Dump", Retrieved at <<http://en.wikipedia.org/wiki/Beam_dump>>, Jul. 22, 2009, pp. 2.

Swain, et al., "Manufacturing Low Insertion Loss Fiber-Lens Elements", Retrieved at <<http://www.photon-inc.com/support/library/pdf/Mfg_FiberLensElements.pdf>>, pp. 1-7.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

OPTICAL FAULT MONITORING

BACKGROUND

Optical projectors and other optical devices may utilize a laser or other relatively bright light source to project an image onto a surface. For example, some depth-sensing cameras may utilize a diffractive optical element to transform light from a laser source to project a structured light pattern on a target in the field of view of an image sensor. Variations in the structured light pattern from an expected pattern that are caused by the distance of the target from the camera may be used to determine a distance of the target from the camera.

Depth-sensing cameras and other optical systems may rely upon the location of DOEs and other optical components to remain constant for proper device performance. Therefore, in the case of a depth-sensing camera, if an optical element becomes misplaced or damaged, the reference structured light image may change compared to that expected by the image processing software. However, such an optical system fault may not be easily discernable by the camera and depth-sensing image processing software. Therefore, various faults may result.

SUMMARY

Accordingly, various embodiments related to optical fault monitoring are disclosed herein. For example, one disclosed embodiment provides, in an optical system comprising a light source, a light outlet, and an optical element disposed between the light source and the light outlet, a method of monitoring for optical system faults. The method includes detecting, via a light sensor directed toward an interface surface of the optical element closest to the light source, an intensity of light traveling from the interface surface of the optical element to the light sensor, and comparing the intensity of light detected to one or more threshold intensity values. The method further includes identifying an optical system fault condition based on comparing the intensity of light detected to one or more threshold values, and modifying operation of the optical system based upon the optical system fault condition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Optical devices such as depth-sensing cameras may utilize a laser, or other such light source, modulated by a diffractive optical element to project a structured light pattern on a target in the field of view of an image sensor. As such, the distance from the camera to the target (i.e., the depth from the camera to the target) may be determined based on detecting variations in the projected structured light pattern. For example, a variation may be detected if the reference structured light image differs from that expected by the image processing software. However, other sources may cause variations in the projected structured light pattern that are independent of depth detection, and instead result from optical faults in the optical system. Optical faults may include, but are not limited to, damage to and/or contamination of an optical element, changes in positioning of an optical element, physical objects in an optical path of the optical element, and the like. Such optical faults may not be easily discernable by the camera and depth-sensing image processing software, resulting in ambiguity of fault mitigation.

Figure 1:
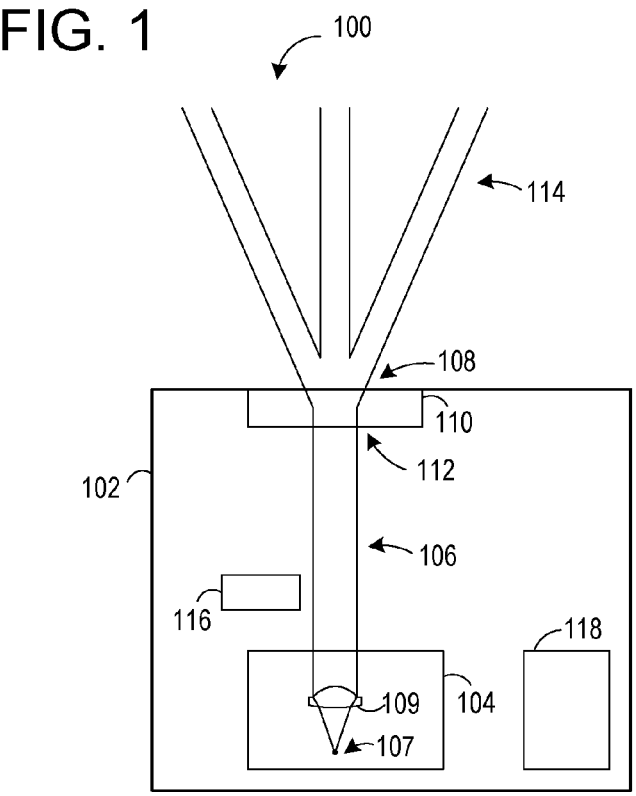
FIG. 1 shows a schematic depiction of an example optical system.

Therefore, the monitoring of faults in such an optical device, as described herein may provide for the detection and determination of optical faults, and enable the application of corrective and/or mitigating actions. FIG. 1 shows an example optical system 100 within an optical device 102, wherein optical device 102 includes a light source 104 configured to output a beam of light 106. Examples of suitable light producing elements 107 for use within light source 104 may include, but are not limited to, one or more lasers, laser diodes, light emitting diodes, etc. Further, in some embodiments, light source 104 may include a collimating lens 109 configured to collimate the beam of light 106.

As depicted, the beam of light 106 exits optical device 102 through a light outlet 108. Light outlet 108 may be any suitable outlet through which the light may leave the optical device, such as a hole, a filter, a plastic cover, a lens, etc. Optical device 102 further includes an optical element 110 disposed between light source 104 and light outlet 108. Optical element 110 may be any suitable optical element configured to receive the beam of light 106 on a light-source side of the optical element (i.e., at an interface surface 112) and to diffract the beam of light 106 to form a structured pattern, as depicted in FIG. 1 at 114. As an example, in a structured light depth sensor, optical element 110 may comprise a diffracting optical element.

Due to propagation reciprocity symmetry, optical element 110 may be bidirectional. As such, in addition to optical element 110 directing the beam of light 106 from an interface surface 112 toward the light outlet 108 as described above, optical element 110 may also direct light received through the light outlet 108 toward the interface surface 112. As an example, upon exiting light outlet 108, beam of light 106 may reflect off of a physical object within the optical path, and this reflected light may then be directed back through light outlet 108 and through optical element 110 toward the interface surface 112.

As such, optical device 102 further includes a light sensor 116 directed toward interface surface 112 of optical element 110 closest to the light source 104 (i.e., a light-source side of the optical element 110) so as to detect such light traveling from interface surface 112 toward light sensor 116. Light sensor 116 may comprise any suitable sensor for detecting an intensity of light traveling from interface surface 112 of optical element 110 to light sensor 116. Examples include, but are not limited to, photodetectors and image sensors.

Optical device 102 further includes a controller 118 configured to perform various device functions. For example, where the optical device 102 is a structured light depth sensor, the controller 118 may be configured to control the projection of a structured light pattern, and to determine a distance of objects located in front of the depth sensor via an image of the structured light pattern, as described above. Further, controller 118 may be configured to detect an optical fault condition based upon a signal received from the light sensor 116. Controller 118 may determine an optical fault condition in any suitable manner. For example, controller 118 may monitor an intensity of light received from interface surface 112 as measured by light sensor 116, and compare the measured intensity of light to one or more threshold intensity values. Controller 118 may be further configured to apply one or more response actions upon detecting an optical fault condition. For example, controller 118 may be further configured to change a power state of optical device 102 if an upper or lower threshold is met (e.g. shut off light source 104), and/or display a warning message on a display device. Methods of optical fault monitoring are described in more detail hereafter with reference to FIGS. 2-4.

Figure 2:
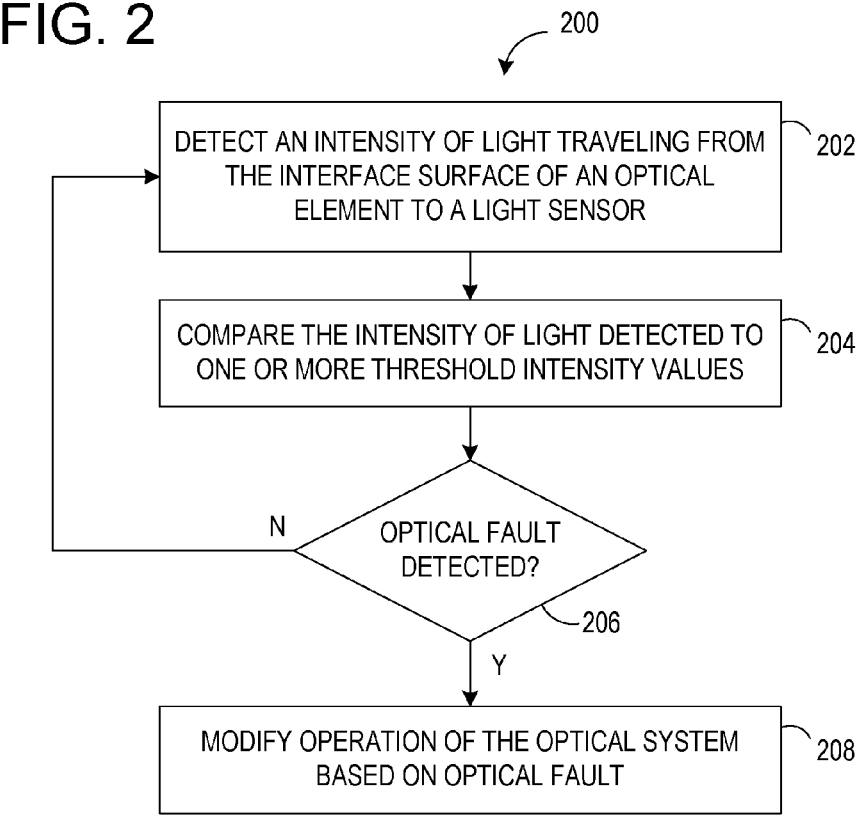
FIG. 2 shows a flow diagram of an embodiment of an example method of monitoring for optical system faults.

FIG. 2 shows a flow diagram of an embodiment of an example of a method 200 of monitoring for optical system faults in an optical system, wherein the optical system comprises a light source, a light outlet, and an optical element disposed between the light source and the light outlet, as described above. At 202, method 200 includes detecting an intensity of light traveling from the interface surface of the optical element to the light sensor. As described above, in some embodiments, an interface surface of an optical element may comprise the surface of the optical element closest to the light source. The intensity of the light may be detected via any suitable sensor, including but not limited to a photodetector and/or an image sensor directed toward the interface surface of the optical element closest to the light source.

Next, at 204, method 200 includes comparing the intensity of light detected to one or more threshold intensity values, and then at 206, determining if an optical fault condition exists based on this comparison. As will be described in more detail hereafter with reference to FIG. 3, identifying an optical system fault condition may include determining that the intensity of light detected is less than a threshold value, greater than a threshold value, outside of an operating range of expected values, etc. Examples of optical system fault conditions include, but are not limited to, a change in a location of the optical element within the optical system, a physical object close to or blocking the light outlet, a contamination of the optical element, and other such conditions that may interfere with proper optical system operation.

Continuing with FIG. 2, if it is determined at 206 that an optical fault is not detected, then method 200 returns to 202. However, if it is determined at 206 that an optical fault is detected, at 208, method 200 includes modifying operation of the optical system based upon the optical system fault condition. The operation of the optical system may be modified in any suitable manner depending upon the nature of the optical fault detected. Examples include, but are not limited to, changing a power state of the optical device, performing a corrective action, displaying a warning message on a display device, displaying a message prompting a user to perform an action, etc. The optical system may further determine whether or not the user has performed the action, and the optical system may then further modify operation of the optical system based on this determination.

As an example, in one embodiment, the optical system may determine an optical fault condition indicating presence of a physical object located on a light-outlet side of the optical element and in the optical path of the optical element. The optical system may in response display on a display device a warning message asking the user to remove the physical object. If the optical system determines that the physical object has not been removed, for example after a predetermined time duration, the optical system may further modify operation of the optical system by performing a shutdown operation. Additional examples of optical fault conditions and corrective actions are described hereafter.

Figure 3:
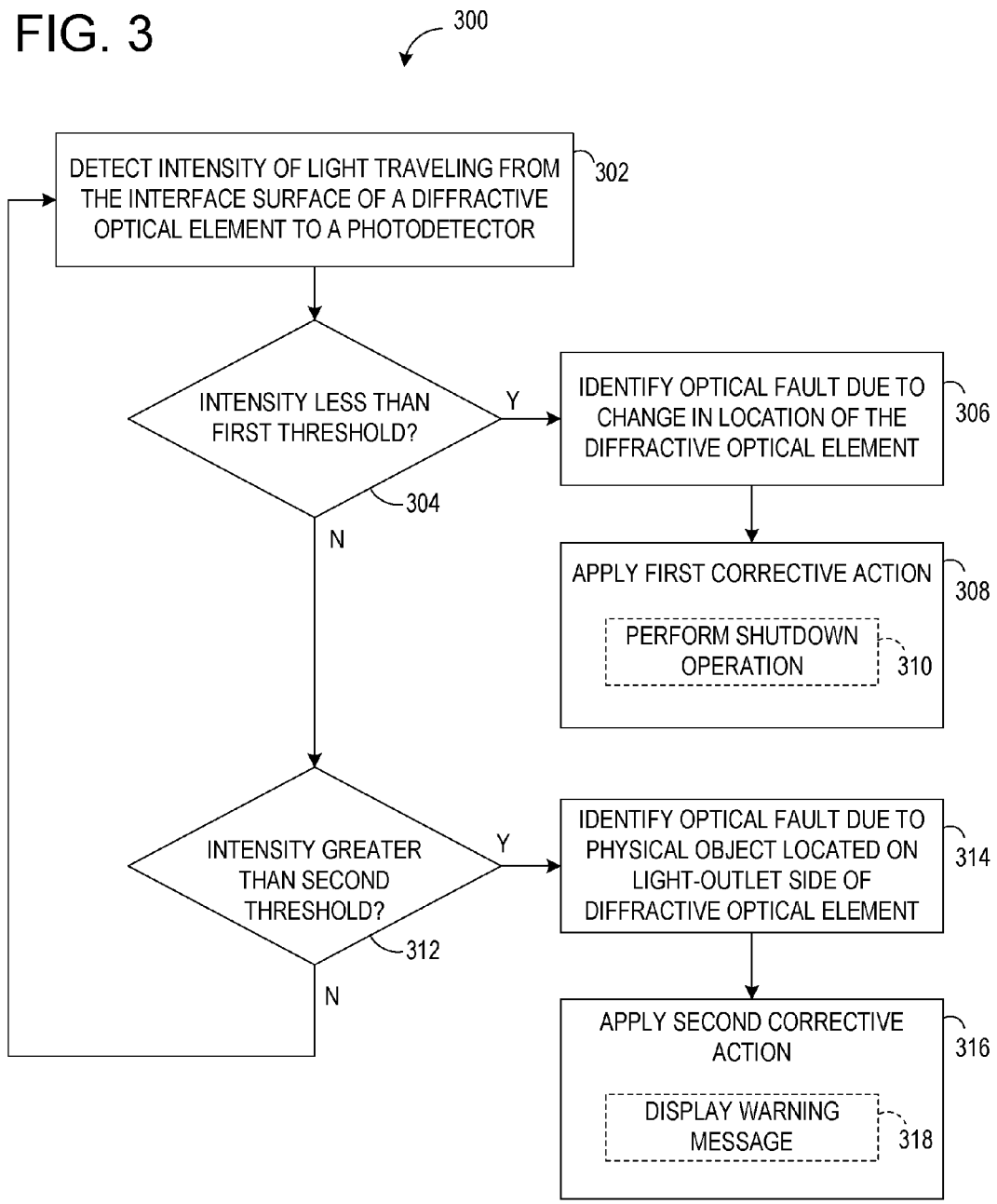
FIG. 3 shows a flow diagram of another embodiment of an example method of monitoring for optical faults.
Figure 4:
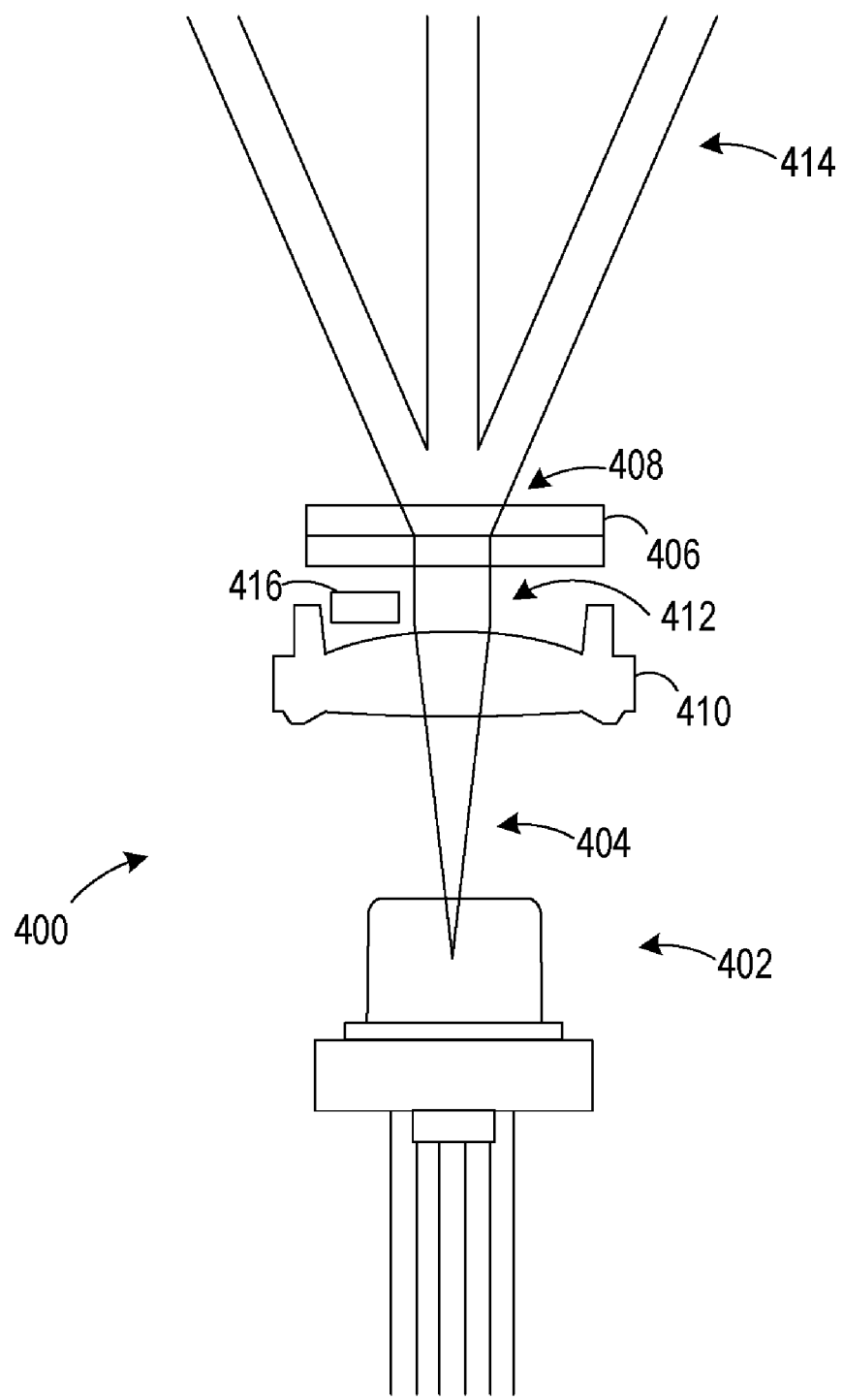
FIG. 4 shows a schematic depiction of an example depth-sensing camera.

FIG. 3 shows a flow diagram of another embodiment of an example method 300 of monitoring for optical faults. Method 300 may be performed, for example, by a structured light depth-sensing camera comprising a light source, a light outlet, and a diffractive optical element disposed between the light source and the light outlet. FIG. 4 shows a schematic depiction of an example embodiment of a depth-sensing camera 400 comprising a light source 402 configured to output a beam of light 404 that is directed through a diffractive optical element 406 toward a light outlet 408. As a nonlimiting example, light source 402 may comprise a laser diode, and may utilize a lens 410 to collimate the beam of light as indicated at 412. Diffractive optical element 406 then outputs diffracted light through light outlet 408 as a structured pattern, as indicated at 414.

Returning to FIG. 3, at 302 method 300 includes detecting, via a photodetector located on a light-source side of the DOE, an intensity of light traveling from the diffractive optical element. As described above, a diffractive optical element and other optical components may be bidirectional in that in addition to transmitting and diffracting light received from the light source, it may also receive light at the light outlet and transmit the light toward the photodetector. FIG. 4 shows an example photodetector 416 located on the light-source side of diffractive optical element 406, and configured to measure an intensity of light traveling from the light-source side of diffractive optical element 406 via inherent reflections.

Continuing with FIG. 3, method 300 next includes comparing the measured intensity of the light to one or more threshold values. Two thresholds are described in more detail as follows, however, it is to be understood that additional and/or other comparisons to additional and/or other threshold values may also be made without departing from the scope of this disclosure. At 304, method 300 includes determining if the intensity of light is less than a first threshold value. If it is determined that the intensity of light is less than a first threshold value, at 306 method 300 includes identifying an optical fault due to a change in a location of the diffractive optical element. For example, the diffractive optical element may have fallen, become dislodged, broken, etc. such that it is no longer properly located within the optical path, thus reducing the intensity of (unintended but inherent) light reflected from the diffractive optical element interface that reaches the photodetector. In this case, as indicated at 308, method 300 may include applying a first corrective action. For example, in some specific embodiments, the first corrective may include performing a shutdown operation to the projector or overall depth-sensing camera, as indicated at 310. It will be understood that the term "shutdown" operation as used herein refers to any operation in which the projected beam of light is shut off, whether or not other device components remain powered.

Continuing with FIG. 2, if it is determined that the intensity of light is not less than the first threshold value, then method 300 proceeds to 312, where it is determined if the intensity of light is greater than a second threshold value. If it is determined that the intensity of light is greater than a second threshold value, at 314 method 300 includes identifying an optical fault due to a physical object blocking the projected beam of light. Such a physical object may be proximal to the light outlet such that light exiting the light-outlet is reflected by the physical object, and then returns back through the diffractive optical element toward the photodetector, thus increasing the intensity of light reaching the photodetector, causing the second threshold to be reached. If it is determined that the intensity of light is greater than the second threshold value, then method 300 comprises applying a second corrective action. As an example, the second corrective action may include displaying a warning message on a display device as indicated at 318. For example, the warning message may indicate to a user that there may be a physical object present in the optical path of the depth-sensing camera interfering with proper operation of the depth-sensing camera and request that the user remove the physical object to continue operation of the depth-sensing camera. It will be understood that any other suitable corrective action may be applied in other embodiments.

In some embodiments, method 300 may further include determining that no response has yet been taken to the warning message, for example, within a predetermined time duration, and performing another corrective action, such as performing a shutdown operation. Then, in some embodiments, the depth-sensing camera may periodically be re-powered to determine whether the object has been removed from the beam path. In some embodiments, after performing a shutdown operation, a response may be detected to the warning message and the optical system may be returned to a normal operating state. In other embodiments, the depth-sensing camera may remain in the shut-down state until re-activated by a user.

Continuing with FIG. 3, if it is determined at 312 that the intensity of light is not greater than a second threshold value, then method 300 returns to 302.

As described above, any other additional and/or alternative threshold comparisons may be used to determine other fault conditions without departing from the scope of this disclosure. For example, in some embodiments, method 300 may include determining if the intensity of light is outside of an operating range of accepted values, for example, due to contamination of an optical component (e.g. moisture on the diffractive optical element, etc.). If it is determined that the intensity of light is outside of such an operating range, method 300 may include identifying an optical fault due to degraded performance of the diffractive optical element or other optical element, and applying a third corrective action.

In some embodiments, the above-described optical system and methods may be tied to a computing device. As an example, a depth-sensing camera may be included within a gaming system including a gaming console and a display device. It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. In an optical system comprising a light source, a light outlet, and an optical element disposed between the light source and the light outlet, a method of monitoring for optical system faults, the method comprising:
   detecting, via a light sensor directed toward an interface surface of the optical element closest to the light source, an intensity of light traveling from the interface surface of the optical element to the light sensor;
   comparing the intensity of light detected to one or more threshold intensity values;
   identifying an optical system fault condition based on comparing the intensity of light detected to one or more threshold values; and
   modifying operation of the optical system based upon the optical system fault condition, wherein modifying operation of the optical system includes one or more of changing a power state of the optical device and providing a warning message for display on a display device.

2. The method of claim 1, wherein identifying the optical system fault condition includes determining that the intensity of light detected is less than a threshold value.

3. The method of claim 2, wherein modifying operation of the optical system includes performing a shutdown operation to the optical system.

4. The method of claim 1, wherein identifying the optical system fault condition includes determining that the intensity of light detected is greater than a threshold value.

5. The method of claim 1, further comprising detecting no response to the warning message, and performing a shutdown operation to the optical system.

6. The method of claim 5, further comprising, after performing the shutdown operation, detecting a response to the warning message and in response, returning the optical system to a normal operating state.

7. An optical device, comprising:
   a light source configured to output a beam of light;
   a diffractive optical element configured to receive the beam of light on a light-source side of the diffractive optical element and to diffract the beam of light to form a structured pattern;
   a photodetector directed toward the light-source side of the diffractive optical element, the photodetector configured to measure an intensity of light traveling from the light-source side of the diffractive optical element; and
   a controller configured to detect an optical fault condition by monitoring the intensity of light as measured by the photodetector and comparing the intensity of light to one or more threshold values and apply a response action upon detecting the optical fault condition, wherein the response action includes one or more of changing a power state of the optical device and providing a warning message for display on a display device.

8. The optical device of claim 7, wherein the controller is further configured to change the power state of the optical device if an upper threshold value is met.

9. The optical device of claim 7, wherein the controller is further configured to change the power state of the optical device if a lower threshold value is met.

10. The optical device of claim 7, wherein the light source comprises a laser diode.

11. The optical device of claim 7, wherein the optical device is a depth-sensing camera.

12. In a depth-sensing camera comprising a light source, a light outlet, and a diffractive optical element disposed between the light source and the light outlet, a method of monitoring for optical faults, the method comprising:
   detecting via a photodetector located on a light-source side of the diffractive optical element an intensity of light traveling from the diffractive optical element;
   comparing the intensity of light to one or more threshold values;
   if the intensity of light is less than a first threshold value, identifying an optical fault due to a change in a location of the diffractive optical element and applying a first corrective action; and
   if the intensity of light is greater than a second threshold value, identifying an optical fault due to a physical object located on a light-outlet side of the diffractive optical element, and in an optical path of the diffractive optical element, and applying a second corrective action.

13. The method of claim 12, further comprising, if the intensity of light is outside of an operating range of accepted values, identifying an optical fault due to degraded performance of the diffractive optical element and applying a third corrective action.

14. The method of claim 12, wherein applying the first corrective action includes performing a shutdown operation to the depth-sensing camera.

15. The method of claim 12, wherein applying the second corrective action includes displaying a warning message on a display device.

16. The method of claim 15, further comprising detecting no response to the warning message within a predetermined time duration, and performing a shutdown operation to the depth-sensing camera.

17. The method of claim 16, further comprising, upon applying the shutdown operation, detecting a response to the warning message and in response, returning the depth-sensing camera to a normal operating state.

* * * * *